United States Patent

Hanlon et al.

(10) Patent No.: US 7,451,664 B1
(45) Date of Patent: Nov. 18, 2008

(54) USER INTERFACE FORCE SENSOR SYSTEM

(75) Inventors: Casey Hanlon, Queen Creek, AZ (US); John F. Thurston, Mesa, AZ (US)

(73) Assignee: Honeywell Interntional Inc., Morristown, NJ (US)

( * ) Notice: Subject to any disclaimer, the term of this patent is extended or adjusted under 35 U.S.C. 154(b) by 0 days.

(21) Appl. No.: 11/863,507

(22) Filed: Sep. 28, 2007

(51) Int. Cl.
*G01L 1/22* (2006.01)

(52) U.S. Cl. .................................. 73/862.045

(58) Field of Classification Search ............ 73/862.045, 73/862.05, 862.044; 345/161, 156
See application file for complete search history.

(56) References Cited

U.S. PATENT DOCUMENTS

| | | | |
|---|---|---|---|
| 3,434,342 A | 3/1969 | Kazmarek | |
| 3,447,766 A | 6/1969 | Palfreyman | |
| 3,676,818 A | 7/1972 | Oliver | |
| 4,217,569 A | 8/1980 | Nejedly et al. | |
| 4,680,577 A | 7/1987 | Straayer et al. | |
| 5,228,348 A | 7/1993 | Frigiere | |
| 5,325,081 A | 6/1994 | Roberts | |
| 5,489,900 A | 2/1996 | Cali et al. | |
| 5,594,618 A | 1/1997 | Sellers | |
| 5,754,167 A | 5/1998 | Narusawa et al. | |
| 5,767,840 A | 6/1998 | Selker | |
| 5,831,596 A | 11/1998 | Marshall et al. | |
| 5,894,301 A | 4/1999 | Seffernick | |
| 5,966,117 A | 10/1999 | Seffernick et al. | |
| 6,002,388 A | 12/1999 | Seffernick et al. | |
| 6,040,823 A * | 3/2000 | Seffernick et al. | 345/168 |
| 6,137,475 A * | 10/2000 | Ginn et al. | 345/161 |
| 6,184,865 B1 * | 2/2001 | Zimmerman et al. | 345/160 |
| 6,195,082 B1 | 2/2001 | May et al. | |
| 6,243,077 B1 | 6/2001 | Manara et al. | |
| 6,323,840 B1 | 11/2001 | Steinbrunner | |
| 6,331,849 B1 | 12/2001 | VandenBoom | |
| 6,353,431 B1 | 3/2002 | Poole et al. | |
| 6,400,355 B1 | 6/2002 | Pin-Chien | |
| 6,411,193 B1 * | 6/2002 | Chen | 338/47 |
| 6,697,049 B2 | 2/2004 | Lu | |
| 6,753,850 B2 | 6/2004 | Poole | |
| 6,788,291 B2 | 9/2004 | Burry | |
| 7,065,861 B2 | 6/2006 | Schafert et al. | |

* cited by examiner

*Primary Examiner*—Jewel Thompson
(74) *Attorney, Agent, or Firm*—Ingrassia, Fisher & Lorenz, P.C.

(57) ABSTRACT

A mechanical architecture for a user interface system enables the use of the low cost commercial load cells. Force inputs to a user interface that is rotatable about two perpendicular axes are reacted in each axis by cantilevered load cells. Two load cells react the loads in each axis, thereby enabling the system to exhibit quadruple redundancy in the load cells.

20 Claims, 2 Drawing Sheets

USER INTERFACE FORCE SENSOR SYSTEM

TECHNICAL FIELD

The present invention generally relates to user interfaces and, more particularly to user interface system that includes a plurality of low-cost force sensing devices.

BACKGROUND

User interfaces that are used to translate human movements to machine movements are used in myriad industries. For example, some aircraft flight control systems include a user interface in the form of one or more control sticks, pedals, or other mechanisms. The flight control system, in response to input forces supplied to the user interface(s) from the pilot and/or co-pilot, controls the movements of various aircraft flight control surfaces. No matter the particular end-use system, the user interface preferably includes some type of mechanism to supply haptic feedback, through the user interface, to the user.

Many haptic feedback mechanisms are implemented using a force sensor as the primary input device to the feedback loop. In most instances, the force sensor drives some type of servo amplifier, which in turn drives a motor. The motor, which may be coupled to the user interface via a gearbox, supplies a feedback force to the user interface. Although these types of haptic feedback mechanisms are generally safe and reliable, they do suffer certain drawbacks. For example, the force sensor (or sensors) that are typically used are relatively high-fidelity force sensors, which increase overall system cost and complexity. Moreover, when redundancy and minimization of cross-axis coupling are employed to increase overall system reliability, the increased cost and complexity can be significant.

Hence, there is a need for a method of sensing the force in a user interface system that exhibits suitable fidelity, redundancy, and/or minimal cross-axis coupling, without significantly impacting overall system cost and complexity. The present invention addresses at least this need.

BRIEF SUMMARY

In one embodiment, and by way of example only, a user interface system includes a user interface and a plurality of load cells. The user interface is configured to rotate, from a null position, in first and second directions about a first rotational axis, and in first and second directions about a second rotational axis that is perpendicular to the first rotational axis. The user interface is adapted to receive an input force and, in response to the input force, to rotate, from the null position to a control position, about one or both of the first and second rotational axes. The plurality of load cells are coupled to, and extend in cantilevered manner from, the user interface. Each load cell is configured to at least selectively sense the input force supplied to the user interface. The plurality of load cells includes a first pair of load cells and a second pair of load cells. The first pair of load cells each extend along a respective first load cell axis that intersects the second rotational axis, and the second pair of load cells each extend along a respective second load cell axis that intersects the first rotational axis. The first pair of load cells are disposed such that when the user interface is rotated from the null position about the first rotational axis, the input force sensed by one of the first pair of load cells increases and the input force sensed by another of the first pair of load cells decreases. The second pair of load cells are disposed such that when the user interface is rotated from the null position about the second rotational axis, the input force sensed by one of the second pair of load cells increases and the input force sensed by another of the second pair of load cells decreases.

Other desirable features and characteristics of the user interface assembly will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the following description may indicate an aircraft as an end-use environment, it will be appreciated that the invention may be used in any one of numerous environments, and with numerous products, in which a user interface may be included.

Figure 1:
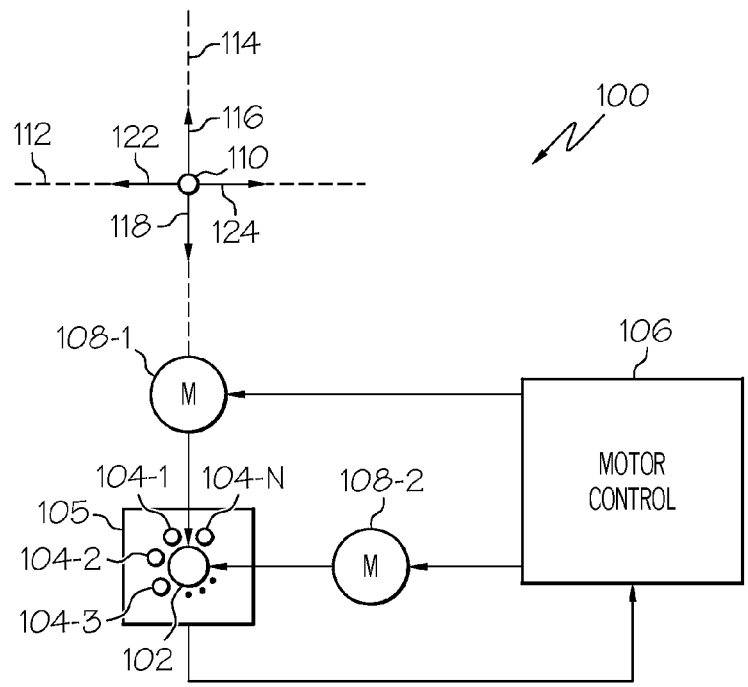
FIG. 1 depicts a functional block diagram of an exemplary multi-axis user interface system.

Turning now to FIG. 1, a functional block diagram of a multi-axis user interface system is depicted. The depicted system 100 includes a user interface 102, a plurality of load cells 104 (e.g., 104-1, 104-2, 104-3, . . . 104-N), a motor control 106, and a plurality of motors 108 (e.g. 108-1, 108-2). The user interface 102 adapted to receive an input force and is movable from a null position 110 to any one of numerous control positions, along a random path, and with multiple degrees of freedom. More specifically, the user interface 102 is coupled to a gimbal assembly 105, and as such is responsive to a supplied input force to rotate, from the null position 110 to a control position, about two perpendicular rotational axes—a first rotational axis 112 and a second rotational axis 114. It will be appreciated that if the user interface 102 is implemented as an aircraft flight control user interface, such as a pilot (or co-pilot) inceptor, then the first and second rotational axes 112, 114 may be referred to as the pitch axis and the roll axis, respectively. No matter its specific end use, the user interface 102 is movable about the first axis 112 in a forward direction 116 and an aft direction 118, and is movable about the second axis 114 in a port direction 122 and a starboard direction 124. It will additionally be appreciated that the user interface 102 may be simultaneously rotated about the first and second rotational axes 112, 114 to move the user interface 102 in a combined forward-port direction, a combined forward-starboard direction, a combined aft-port direction, or a combined aft-starboard direction, and back to or through the null position 110.

Figure 2:
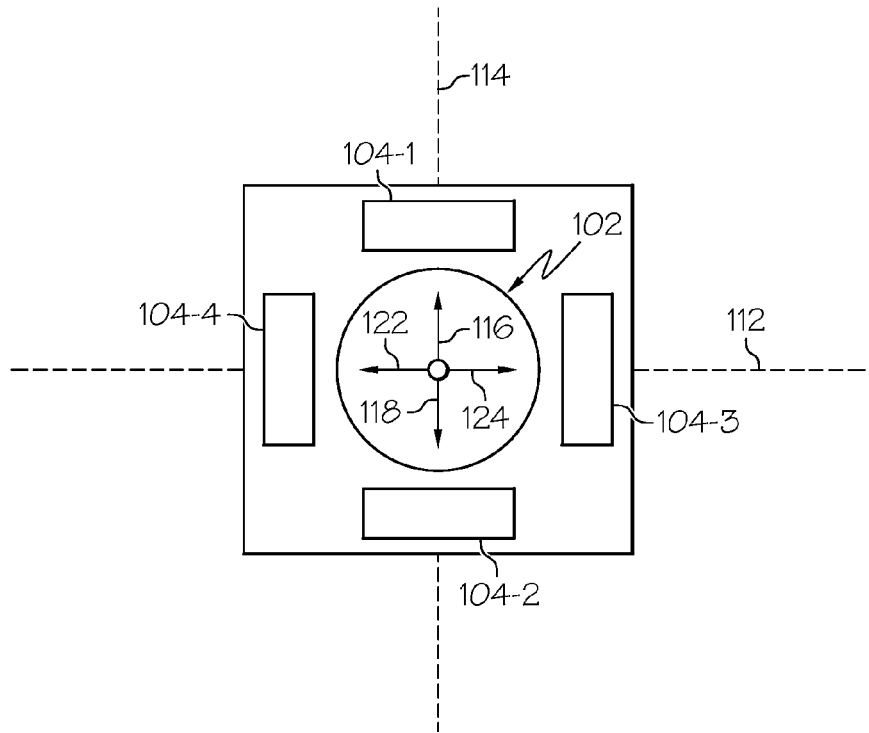
FIG. 2 is a simplified top view representation of an exemplary user interface that may be used to implement the system of FIG. 1.

The plurality of load cells 104 are each disposed adjacent the user interface 102. The load cells 104, particular embodiments of which are described in more detail further below, are preferably low cost commercial load cells that are operable to at least selectively sense the input force that a user is applying to the user interface 102. In response, the load cells 104 supply force feedback signals representative of the sensed force to the motor control 106. Preferably, the load cells 104 are spaced evenly around the user interface 102. Although the number of load cells 104 may vary, in the depicted embodiment, and as shown most clearly in FIG. 2, the user interface assembly 100 includes four load cells 104 (e.g., 104-1, 104-2, 104-3, 104-4), equally spaced 90-degress apart from each other. A first pair of the load cells 104-1, 104-2 selectively senses the input force when the user interface 102 is moved, fully or partially, in the forward and aft directions 116, 118, and a second pair of the load cells 104-3, 104-4 selectively senses the input force when the user interface 102 is moved, fully or partially, in the port and starboard directions 122, 124. No matter the specific number of load cells, the motor control 106, upon receipt of at least the force feedback signals, supplies motor drive signals to one or both of the motors 108-1, 108-2.

Returning once again to FIG. 1, the motors 108-1, 108-2, which are each coupled to the user interface 102, are each operable, upon receipt of motor drive signals, to supply a feedback force to the user interface 102. It will be appreciated that, at least in some embodiments, non-illustrated gear sets may be disposed between each motor 108-1, 108-2 and the user interface 102, if needed or desired. It will additionally be appreciated that, at least in some embodiments, the motor drive signals may be variable in magnitude, based on one or more user interface parameters and/or one or more external signals supplied to the motor control 106. These parameters and/or external signals, if included, may vary depending, for example, on the actual end-use environment of the user interface system 100. For example, if the user interface system 100 is used in a flight control system, the parameters may include the position of the user interface 102, the slew rate of the user interface 102, and the external signals may include various aircraft and control surface conditions, and the position of a non-illustrated co-pilot user interface. The user interface, in response to the feedback force supplied from the motors 108-1, 108-2, supplies haptic feedback to a user via the user interface 102. In a particular preferred embodiment, the motors 108-1, 108-2 are implemented as brushless DC motors. It will be appreciated, however, that other types of motors may also be used.

Figure 3:
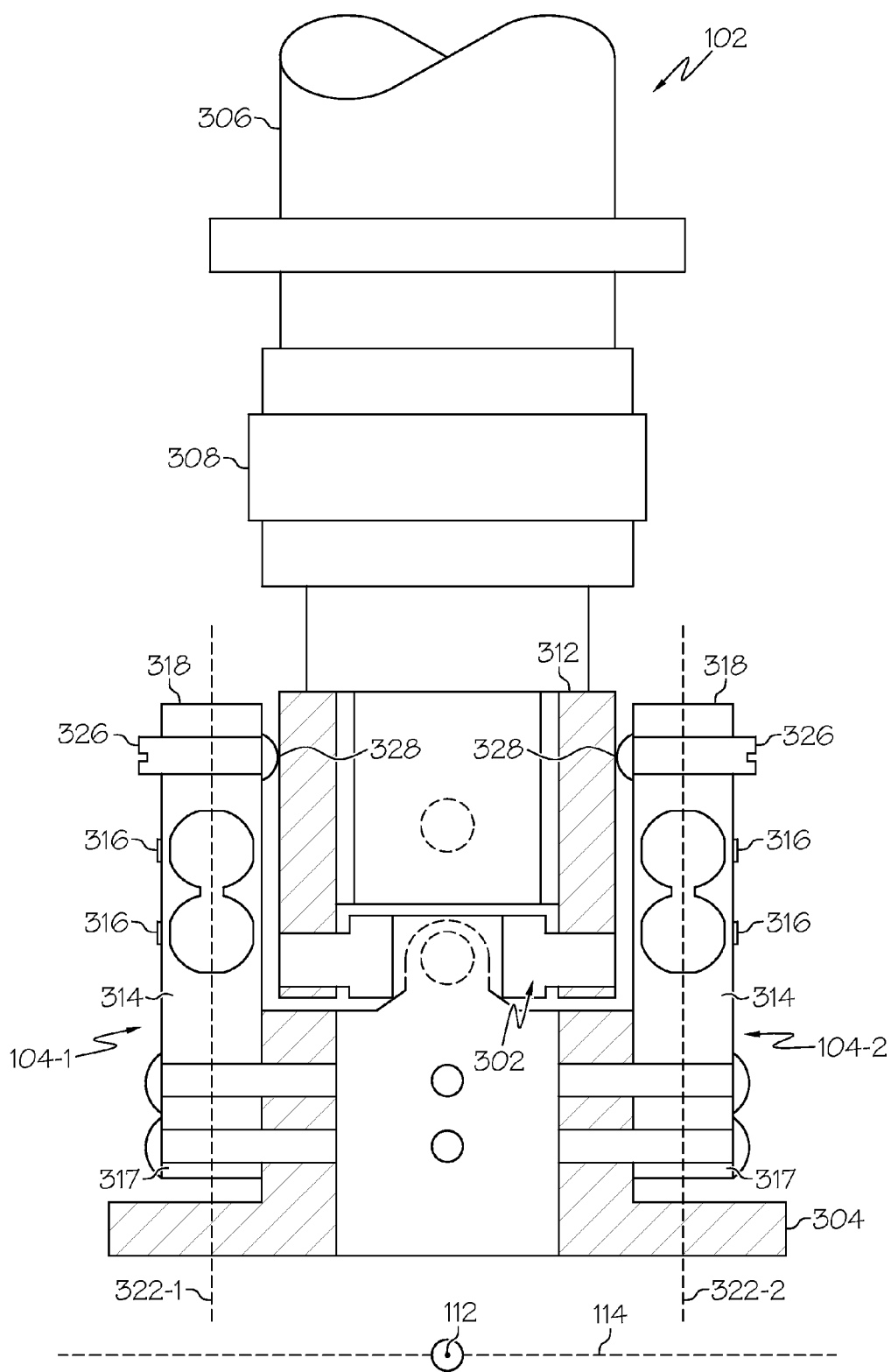
FIG. 3 depicts a partial cross section view of an exemplary embodiment of portions of a user interface system that may be used to implement the system of FIG. 1.

Turning now to FIG. 3, a partial cross section view of an exemplary embodiment of portions of the user interface system 100 are depicted. More specifically, FIG. 3 depicts a portion of the user interface 102 and the first pair of the load cells 104-1, 104-2. It is seen that the user interface 102, at least in the depicted embodiment, includes a universal joint 302, a base 304, a grip 306, a connector 308, and a body 312. The grip 306 is configured to be grasped by a hand of a user, and thus receive input force from the user. The connector 308 is coupled to the grip 306 and the body 312. The body 312 is in turn coupled to the universal joint 302.

The universal joint 302 is coupled between the base 304 and the body 312, and provides for complete decoupling of cross-axis forces. For example, due to the presence of the universal joint 302, if a force is applied to the grip 306 solely in a forward or aft direction (or solely in a port or starboard direction), then only two of the load cells 104-1, 104-2 (or 104-3, 104-4) will sense a change in force. If the universal joint 302 were not included, one or both of the other two load cells 104-3, 104-4 (or 104-1, 104-2) would sense a change in force, and supply one or more undesired signals. The universal joint 302 may be variously configured to implement this functionality. For example, it may be configured as a Cardon joint or any one of numerous other suitable devices. No matter its specific implementation, the universal joint 302 is coupled to the base 304. In the depicted embodiment, the base 304 is adapted to be coupled to one or both motors 108 and to the gimbal assembly 105 (not depicted in FIG. 3).

With continued reference to FIG. 3, it is seen that the load cells 104 are each coupled to the user interface 102 and each includes a beam 314 and a plurality of strain gages 316. The beams 304 each include a fixed end 317 and a free end 318. The beam fixed end 317, as its name connotes, is coupled to the a first portion of the user interface 102, and the beam free end 318 is disposed adjacent a second portion of the user interface 102. It may thus be appreciated that the load cells 104 extend, in cantilevered manner, from the first portion of the user interface 102 toward the second portion of the user interface 102. The first pair of load cells 104-1, 104-2 each extend, from its respective fixed end 317 to its respective free end 318, along a respective first load cell axis 322-1, 322-2 that intersects the second rotational axis 114. Similarly (although not depicted in FIG. 3), the second pair of load cells 104-3, 104-4 each extend, from its respective fixed end 317 to its respective free end 318, along a respective second load cell axis that intersects the first rotational axis 112. In the depicted embodiment, the first load cell axes 322-1, 322-2 each intersect the second rotational axis 114 at a right angle, and the second load cell axes each intersect the first rotational axis 112 at a right angle. It will be appreciated, however, that first pair of load cells 104-1, 104-2 could alternatively be disposed so that the first load cell axes 322-1, 322-2 intersect the second rotational axis 114 at a non-right angle, and that second pair of load cells 104-3, 104-4 could alternatively be disposed so that the second load cell axes intersect the first rotational axis 112 at a non-right angle. It is noted that in the depicted embodiment the load cells 104 are each coupled to the base 304 and extend, in cantilever manner, toward the body 312. It will nonetheless be appreciated that in an alternate embodiment, the load cells 104 may be coupled to the body 312 and extend, in cantilevered manner, toward the base 304.

The strain gages 316, as is generally known, are devices that exhibit variations in electrical resistance in response to deformation. The strain gages 316 are disposed on the beam 314, and thus exhibit electrical resistance variations in response to deformation of the beam 314. Preferably, the plurality of strain gages 316 on each beam 314 are configured to implement a Wheatstone bridge strain gage sensor. In some embodiments, where an added level of redundancy is needed or desired, the plurality of strain gages 316 on each beam 314 are configured to implement one or more pair of Wheatstone bridge strain gages sensors.

As FIG. 3, further depicts, each load cell 104 additionally includes a preload adjustment mechanism 326. The preload adjustment mechanism 326 extends through the beam 314, and engages at least a portion of the user interface 102. In the depicted embodiment the preload adjustment mechanism 326 engages the body 312. Preferably, the preload adjustment mechanism 326 is movable relative to the beam 314, for example via mating threads on the beam 314 and the preload adjustment mechanism 326. This configurations allows a preload on each load cell 104 to be an adjustably set. The particular preload value may vary, but in one particular embodiment, each load cell 104 is preferably preloaded, via its associated preload adjustment mechanism 326, to approximately half of its maximum load value. Each adjustment mechanism 326 includes a rounded, or semispherical, section, that engages the body 312 at a contact point 328. It is at this contact point 328 where the force is measured by each load cell 104.

As noted above, each load cell 104 is configured to at least selectively sense the input force supplied to the user interface. More specifically, as may be seen with continued reference to FIG. 3, if a force is applied to the user interface 102 that moves the user interface 102 directly toward, for example, one of the first pair of load cells 104-1 (104-2), then that load cell 104-1 (104-2) will sense an increase in load. The other of the first pair of load cells 104-2 (104-1), however, will sense a corresponding decrease in load. If a force is applied to the user interface 102 that moves the user interface 102 in a direction between one of the first pair of load cells 104-1, 104-2 and one of the second pair of load cells 104-3, 104-4, then those two load cells 104 will sense an increase in load, and the other two load cells will sense a corresponding decrease in load.

The total load at the contact point 328, where the loads are sensed by each load cell 104, may be determined using any one of numerous suitable techniques. For example, the total load may be determined from the square root of the sum of the squares of the positive load change measured by the two load cells 104 that sense increasing load. Alternatively, the total load may be determined by from the square root of the sum of the squares of the negative load change measured by the two load cells 104 that sense decreasing load. In yet another alternative embodiment, the motor control 106 could be a dual-channel control, and one of the first pair of load cells 104-1 (104-2) and one of the second pair of load cells 104-3 (104-4) could be used to supply force signals to one motor control channel, while the other one of the first pair of load cells 104-2 (104-1) and the other one of the second pair of load cells 104-4 (104-3) could be used to supply force signals to a second, redundant motor control channel.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A user interface system, comprising:
a user interface configured to rotate, from a null position, in first and second directions about a first rotational axis and in first and second directions about a second rotational axis, the second rotational axis perpendicular to the first rotational axis, the user interface adapted to receive an input force and, in response to the input force, to rotate, from the null position to a control position, about one or both of the first and second rotational axes;
a plurality of load cells coupled to, and extending in cantilevered manner from, the user interface, each load cell configured to at least selectively sense the input force supplied to the user interface, the plurality of load cells including a first pair of load cells and a second pair of load cells, the first pair of load cells each extending along a respective first load cell axis that intersects the second rotational axis, the second pair of load cells each extending along a respective second load cell axis that intersects the first rotational axis,
wherein:
the first pair of load cells are disposed such that when the user interface is rotated from the null position about the first rotational axis, the input force sensed by one of the first pair of load cells increases and the input force sensed by another of the first pair of load cells decreases, and
the second pair of load cells are disposed such that when the user interface is rotated from the null position about the second rotational axis, the input force sensed by one of the second pair of load cells increases and the input force sensed by another of the second pair of load cells decreases.

2. The user interface system of claim 1, wherein each load cells comprises:
a beam having a fixed end and a free end, the fixed end coupled to a first portion of the user interface, the free end disposed adjacent a second portion of the user interface;
a plurality of strain gages coupled to the beam and operable to sense variations in force applied to the beam.

3. The user interface system of claim 2, wherein the plurality of strain gages are configured to implement one or more Wheatstone bridge strain gages.

4. The user interface system of claim 2, wherein each load cell further comprises:
a preload adjustment extending through the beam and engaging the user interface, the preload adjustment movable within the beam to adjust a force preload on the load cell.

5. The user interface system of claim 4, wherein:
each preload adjustment includes at least a semispherical section that engages the user interface at an engagement point; and
each load cell senses the input force at the engagement point of its preload adjustment.

6. The user interface system of claim 5, wherein the user interface comprises:
a base;
a grip configured to be grasped by a user hand;
a connector coupled to the grip; and
a body coupled between the connector and the base, the body engaged by each adjustment preload at each engagement point.

7. The user interface of claim 6, wherein the beam fixed end is coupled to the base.

8. The user interface system of claim 6, further comprising:
a universal joint assembly coupled between the user interface and the base.

9. The user interface system of claim 1, wherein the planes in which each load cell is disposed are at least substantially perpendicular to the first and second axes, respectively.

10. The user interface system of claim 1, wherein the plurality of loads cells are spaced evenly apart from each other.

11. The user interface system of claim 10, wherein:
the first pair of load cells are disposed 180-degrees apart from each other; and
the second pair of load cells are disposed 180-degrees apart from each other.

12. A user interface system, comprising:
a user interface configured to rotate, from a null position, in first and second directions about a first rotational axis and in first and second directions about a second rotational axis, the second rotational axis perpendicular to the first rotational axis, the user interface adapted to receive an input force and, in response to the input force, to rotate, from the null position to a control position, about one or both of the first and second rotational axes;

a plurality of load cells coupled to, and extending in cantilevered manner from, the user interface, each load cell configured to at least selectively sense the input force supplied to the user interface, the plurality of load cells spaced evenly apart from each other and including a first pair of load cells and a second pair of load cells, the first pair of load cells disposed perpendicular to the first rotational axis, the second pair of load cells disposed perpendicular to the second rotational axis, wherein:

the first pair of load cells are further disposed such that when the user interface is rotated from the null position about the first rotational axis, the input force sensed by one of the first pair of load cells increases and the input force sensed by another of the first pair of load cells decreases, and the second pair of load cells are further disposed such that when the user interface is rotated from the null position about the second rotational axis, the input force sensed by one of the second pair of load cells increases and the input force sensed by another of the second pair of load cells decreases.

13. The user interface system of claim 12, wherein each load cells comprises:

a beam having a fixed end and a free end, the fixed end coupled to a first portion of the user interface, the free end disposed adjacent a second portion of the user interface;

a plurality of strain gages coupled to the beam and operable to sense variations in force applied to the beam.

14. The user interface system of claim 13, wherein the plurality of strain gages are configured to implement one or more Wheatstone bridge strain gages.

15. The user interface system of claim 13, wherein each load cell further comprises:

a preload adjustment extending through the beam and engaging the user interface, the preload adjustment movable within the beam to adjust a force preload on the load cell.

16. The user interface system of claim 15, wherein:

each preload adjustment includes at least a semispherical section that engages the user interface at an engagement point; and each load cell senses the input force at the engagement point of its preload adjustment.

17. The user interface system of claim 16, wherein the user interface comprises:

a base;

a grip configured to be grasped by a user hand;

a connector coupled to the grip; and a body coupled between the connector and the base, the body engaged by each adjustment preload at each engagement point.

18. The user interface of claim 17, wherein the beam fixed end is coupled to the base.

19. The user interface system of claim 12, further comprising:

a universal joint assembly coupled between the user interface and the base.

20. The user interface system of claim 12, wherein:

the first pair of load cells are disposed 180-degrees apart from each other; and the second pair of load cells are disposed 180-degrees apart from each other.

* * * * *

UNITED STATES PATENT AND TRADEMARK OFFICE
CERTIFICATE OF CORRECTION

| | |
|---|---|
| PATENT NO. | : 7,451,664 B1 |
| APPLICATION NO. | : 11/863507 |
| DATED | : November 18, 2008 |
| INVENTOR(S) | : Casey Hanlon et al. |

It is certified that error appears in the above-identified patent and that said Letters Patent is hereby corrected as shown below:

Front of the patent section (73), "Honeywell Interntional Inc.," should be changed to --Honeywell International, Inc.--;
Column 7, line 29, "cells" should be changed to --cell--.

Signed and Sealed this

Seventeenth Day of February, 2009

JOHN DOLL
*Acting Director of the United States Patent and Trademark Office*